United States Patent [19]

Dingfelder et al.

[11] Patent Number: 5,378,860
[45] Date of Patent: Jan. 3, 1995

[54] SYSTEM AND METHOD FOR THE PREVENTION OF THEFT IN SALESROOMS

[76] Inventors: Heinz Dingfelder, Irrlrinnig 15 b, D-855o Forchheim; Heinz Boxleitner, Forstwaldstr. 14, D-8351 Neuschönau, both of Germany

[21] Appl. No.: 39,787

[22] Filed: Mar. 30, 1993

[30] Foreign Application Priority Data

Sep. 21, 1992 [EP] European Pat. Off. ........ 92116091.7

[51] Int. Cl.6 ...................... G01G 19/40; G01G 19/62; A63F 9/02; G06K 15/00
[52] U.S. Cl. ..................................... 177/25.19; 177/1; 177/50; 186/61; 235/383
[58] Field of Search .......................... 177/25.19, 50, 1; 186/61; 235/383

[56] References Cited

U.S. PATENT DOCUMENTS 3,750,158  7/1973  Anastassakis ...................... 177/50 X
5,123,494  6/1992  Schneider ................................ 177/50

FOREIGN PATENT DOCUMENTS 77420     4/1983  European Pat. Off. .
2365845   4/1978  France .
2206598   8/1972  Germany .
2647061  10/1978  Germany .
2840716   3/1980  Germany .
8225698   6/1983  Germany .
3602303   7/1987  Germany .
2040055   8/1980  United Kingdom .
1601724  11/1981  United Kingdom .

Primary Examiner—George H. Miller, Jr.
Attorney, Agent, or Firm—Sughrue, Mion, Zinn, Macpeak & Seas

[57] ABSTRACT

The invention relates to a system for the prevention of theft in salesrooms. The weight of a customer is measured when he enters and when he leaves the salesrooms, and the two measurements are compared. According to the invention, a zone for placing the goods on a conveyor belt is separated spatially from a zone for paying for the goods. The zone for paying can be reached only after passing of an exit installation having a weighing device.

10 Claims, 2 Drawing Sheets

SYSTEM AND METHOD FOR THE PREVENTION OF THEFT IN SALESROOMS

BACKGROUND OF THE INVENTION

The present invention relates to a system for the prevention of theft by means of an entrance and exit control in salesrooms, especially in a supermarket, including an entrance installation having a first weighing device, an exit installation having a second weighing device, and a check-out installation as well as a goods transport device associated therewith, especially a conveyor belt, with a zone for placing the goods on the goods transport device (depositing zone) and, adjacent thereto, a zone for paying for the goods (paying zone). Additionally, the invention relates to a method for the prevention of theft in salesrooms.

To inhibit theft in salesrooms, for example in the retail or wholesale trade, it is known to secure the goods by means of attaching markings. Monitoring means in the form of cameras or mirrors are sometimes used as well. DE-A-27 43 014 discloses another principle, in which individuals who enter a salesroom are weighed at the entrance and the exit. If the second weight measurement is higher than the first, a signal is generated. To measure the weight, a weighing device is arranged in the region of a barrier. An exit barrier is disposed immediately next to a check-out installation which is associated with a conveying plane. The weight control system may easily generate faulty signals as a result of skillful deceipt when the goods are placed on the conveying plane or in connection with change given in the form of heavy coins.

SUMMARY OF THE INVENTION

It is the object of the present invention to improve the known anti-theft system and the corresponding method and, in particular, to essentially exclude possible errors and manipulations during the weighing process.

The system according to the invention attains this object by separating the paying zone from the depositing zone, such that the paying zone can be reached only after passing of the second weighing device in the exit installation. In supermarkets in which the weight of customers is not checked, the customer places the goods on a conveyor belt and pays for them immediately thereafter. The system according to the invention spatially and sequentially separates the step of depositing the goods from the step of paying for the goods. After the goods have been placed on the goods transport device, the customer has to measure his weight in the region of the exit installation. It is not until then, that the customer is able to pay for the goods in a zone which is separated from the depositing zone. Accordingly, the goods are not paid for until the weight of the customer has been checked. Consequently, any weight differences which may be caused by additional or less hard cash which the customer carries after payment do not affect weighing results. Moreover, manipulations by way of not placing all the goods on the goods transport device are effectively prevented.

Advantageously, the exit installation with the second weighing device is screened off from the goods transport device, so that a person who is inside the exit installation does not have any access to the goods located on the goods transport device.

It is of particular advantage, if the exit installation and the goods transport device are arranged in spaced relationship, and if there is a barrier between the depositing zone and the paying zone. This spatial distance between exit installation and goods transport device alone prevents any attempts of manipulation. Because of the barrier, the exit installation has to be passed in order to get from the depositing zone to the paying zone. Another advantage of the described system is that individuals which have not bought anything and do not have to pay can easily leave the salesrooms. These individuals can pass the exit installation without having to go through the check-out area which is usually very narrow.

BRIEF DESCRIPTION OF THE DRAWINGS

Further features of the invention are readily apparent from the claims and the specification. Advantageous embodiments of the invention will be described hereinafter, in detail, with reference to the drawings, in which:

DETAILED DESCRIPTION OF THE PREFERRED EMBODIMENTS

Figure 1:
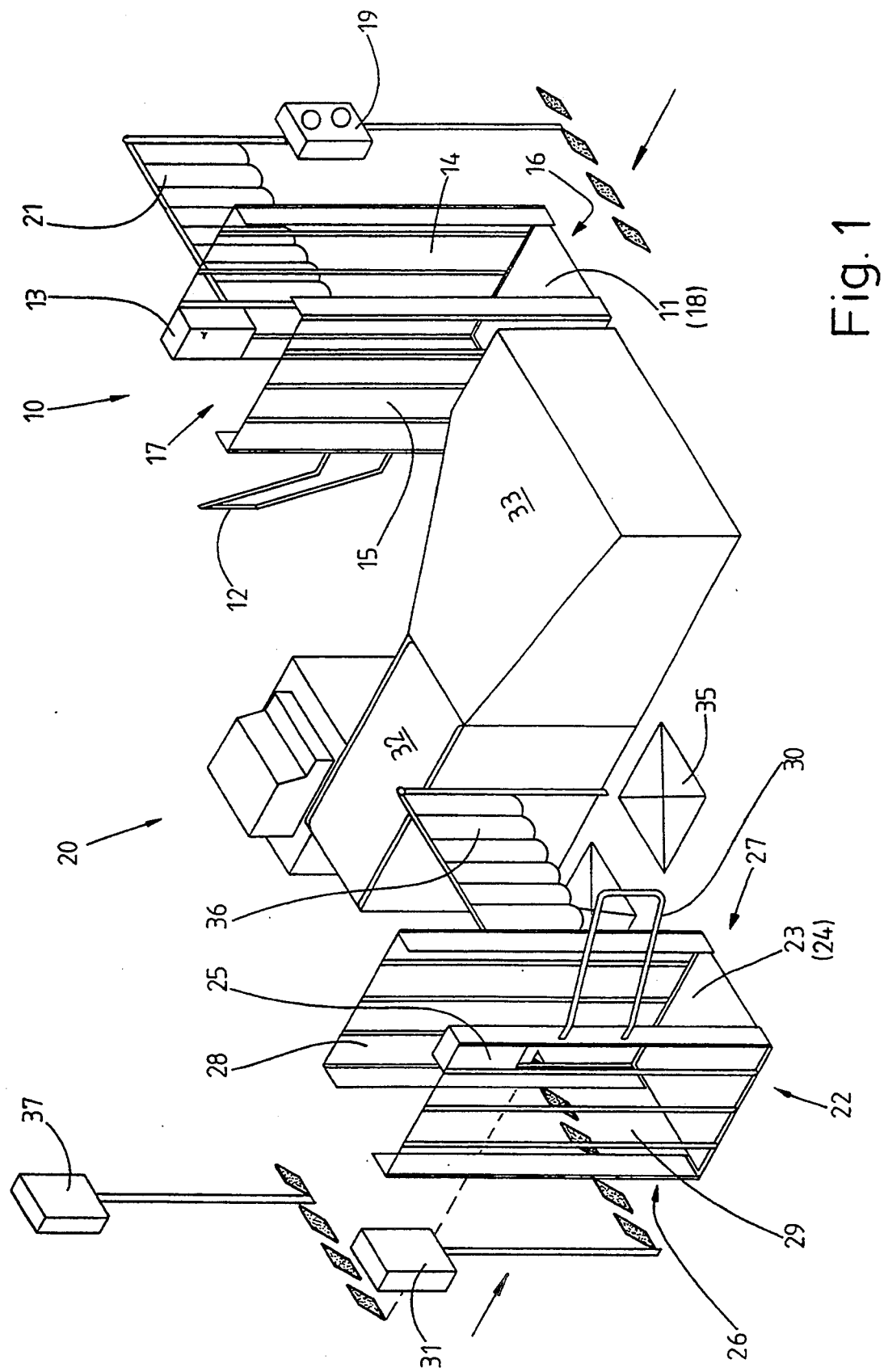
FIG. 1 is a perspective view of a system for the prevention of theft according to the invention.
Figure 2:
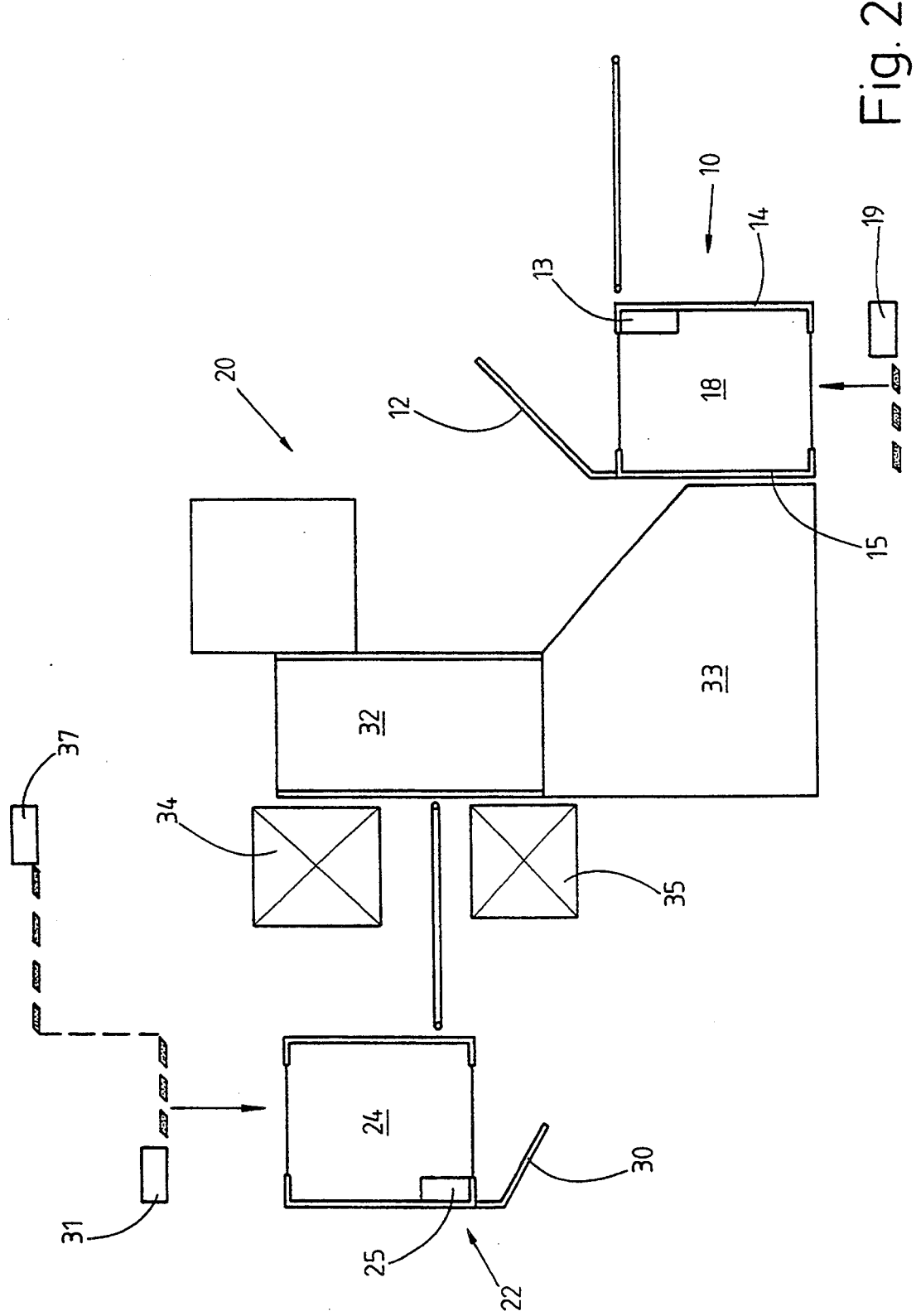
FIG. 2 shows a top plan view of the system of FIG. 1.

A system for the prevention of theft in salesroom comprises an entry installation 10 with a first weighing device 11, a gate 12 and a ticket dispenser 13. The entry installation 10 has two vertical walls 14, 15 which define a passageway with an entrance 16 and an exit 17 between them. Furthermore, the weighing device 11 with a weighing platform 18 is disposed between the walls 14, 15 and the entrance 16 and the exit 17. The ticket dispenser 13, the gate 12 and the walls 14, 15 are coupled mechanically to the weighing platform 18, so that any forces which are applied to them are transmitted to the weighing platform 18. As a result, it is impossible for a customer to manipulate weighing by supporting himself on the walls, the dispenser or the barrier. For this purpose, the ticket dispenser is arranged on the wall 14, whereas the gate 12 is attached to the wall 15 in an articulated manner.

At the entry side, i.e. before entering the entry installation 10, there is a light signal device 19 which generates signals. Entrance to the entry installation 10 is controlled by optical signals, for example by a red or green light. Only one person is to step on the weighing platform 18 at one time. The light signal device 19 is coupled to the weighing platform 18 and the gate 12 in an appropriate manner.

The entry installation 10 is positioned next to a check-out installation 20 and has, laterally next to the wall 14, a passage 21 for shopping trolleys of carts, it would also be possible to dispose the entry installation 10 in a different place, for example in the form of a central entry area for a large supermarket, and independently of the lcoation of the check-outs.

The ticket dispenser 13 is coupled electronically to the weighing device 11 and the gate 12 and dispenses a data carrier for the customer standing on the weighing platform 18 which records the weight of the customer and a serial number. The data carrier can take the form of a plastic or paperboard card. The data may be recorded in the form of a bar code or on a magnetic strip. Preferably, the card has a microchip, similar to the telephone cards already in use. The microchip can be re-programmed by the ticket dispenser, which makes the card reusable.

Analogously to the entry installation 10, there is an exit installation 22 comprising a weighing device 23 and a weighing platform 24, a ticket controlling device 25 as well as walls 28, 29 which define an entrance 26 and an exit 27, and a gate 30. A light signal device 31 which controls the entrance to the exit installation 22 is disposed in front of the exit installation 22 within the salesroom.

The exit installation 22 is disposed near the check-out installation 20, in the present case at a distance from the check-out installation and screened off therefrom by the wall 28.

The check-out installation 20 is associated with a goods transport device, in this case a conveyor belt 32 which is followed by a goods chute 33. As it is conventional practice in supermarkets, the customer is to place the goods on the conveyor belt 32 and remove them from the goods chute 33 after paying. Near the conveyor belt 32, there is a so-called depositiong zone 34 for depositing the goods on the conveyor belt 32, and a paying zone 35 for paying the goods. The paying zone 35 is located approximately next to the transition from the conveyor belt 32 to the goods chute 33, that is to say at the end of the conveyor belt.

The distance between the exit installation 22 and the conveyor belt 32 corresponds approximately to the space required by the depositing zone 34 and the paying zone 35. The depositing zone 34 and the paying zone 35 are separated from one another by a barrier 36 which takes the form of a passage for a shopping trolley.

Inside the salesroom, a light signal device 37 is disposed about 1 m in front of the check-out installation 20. This light signal device controls the access to the depositing zone 34. The light signal device 37 is laterally offset relative to the light signal device 31 and is further away from the exit installation 22 than the light signal device 31.

A typical shopping procedure which includes a weight check can be described as follows:

The customer enters the sales room through the entry installation 10. When the light signal device 19 shows a green light, the customer steps onto the weighing platform 18. The connected ticket dispenser 13 dispenses a ticket including the weight of the customer and a serial number. After withdrawal of the ticket, the barrier 12 can be opened or opens automatically. A shopping trolley can be taken along through the passage 21.

When the light signal device 37 shows an appropriate signal, the customer can enter the depositing zone 34, where he takes the goods from his shopping trolley and places them on the conveyor belt 32. The empty shopping trolley is then pushed through the barrier 36 which takes the form of a passage. The customer himself has to go through the exit installation 22 located laterally next to the barrier 36, again in response to a signal from the light signal device 31. When he stands on the weighing platform 24, the customer must insert his ticket into the ticket controlling device 25 connected to the weighing platform 24. Then, the actual weight of the customer is compared to the weight registered on the ticket. If the discrepancy is within a range of tolerance of 20 to 50 g, the gate 30 opens and the customer, holding his ticket, walks to the paying zone 35 which is separated from the depositing zone 34 by the barrier 36. In the meantime, the goods have been transported on the conveyor belt 32 into the region of the paying zone 35 or the chute 33.

In the paying zone 35, the customer pays and the cashier takes his ticket. After paying, the customer receives his receipt and can remove the goods from the chute 33. The serial number of the ticket is also printed on the receipt, so that customer and purchased goods are associated. The serial number of the ticket is entered into the till either while the goods are deposited in the depositing zone 34 or when the goods are paid for in the paying zone 35.

Because the exit installation 22 is separated from the check-out installation 20, it is easy for customers who do not want to purchase any goods to leave the salesrooms, because they do not have to queue at the cashdesk. The arrangement as described above and the use of gates 12, 30 permit the unproblematic entry and exit of prams and people in wheelchairs. Besides, gates are particularly suitable for goods of large sizes, for example in DIY stores.

In an embodiment which is not shown, each gate 12 or 30 is replaced by a turnstile, which is preferably mechanically coupled to the weighing platform. In this case, the weight measurement is not affected if the person to be measured supports himself on the turnstile. The weight is measured only when the turnstile is located in a specific position. After the measurement is completed and the ticket has been withdrawn, the turnstile is released.

In another embodiment which is not shown, one exit installation 22 is associated with two check-out installations comprising conveyor belt, goods chute, depositing zone, paying zone and barrier. The check-out installations are arranged approximately in a mirror-inverted configuration, whereas the exit installation 22 is located between the two check-out installations. A barrier with a trolley passage is located on the left and right of the exit installation.

We claim:

1. A method for the prevention of theft in salesrooms, including a weight check at the entrance and the exit of the salesroom, in which the weight of a customer measured at the entrance in the region of an entry installation (10) is recorded and compared to the weight measured at the exit in the region of an exit installation (22), and in which, when the customer leaves the salesrooms, payment takes place in the region of a check-out installation (20), and a conveyance of goods in a downstream direction takes place in the region of a goods transport device assigned to the check-out installation (20), said method comprising, in order to leave the salesrooms, the steps of: first placing the goods on the goods transport device in a depositing zone (34); next, measuring the weight of the customer in the region of the exit installation (22); and, thereafter, paying for the goods only in a paying zone (35) which is separated from the depositing zone (34) and located downstream with respect to the goods transport device.

2. The method as claimed in claim 1, further comprising the step of releasing a barrier which prevents a customer's entry from the exit installation (22) to the paying zone only if the determined difference of the weights measured at the entrance installation and the exit installation is below a defined maximum value.

3. A system for the prevention of theft by means of an entrance and exit control in salesrooms, comprising:
   a) an entry installation (10) comprising a first weighing device (11) for weighing customers entering the salesrooms, a first gate (12) which has to be passed after weighing and a ticket dispenser (13);

b) an exit installation (22) comprising a second weighing device (23) for weighing customers exiting the salesrooms, a second gate (30) which has to be passed after weighing, and a ticket controlling device (25) for comparing the weights measured by said first and second weighing devices (11, 23) and for controlling said second gate (30);

c) a check-out installation (20) comprising a goods transport device (32), and a goods chute (33), adjoining the goods transport device (33), for the delivery of the goods to the customer, or for the receipt of the goods by the customer;

d) a depositing zone (34) for placing goods on the goods transport device; and e) a paying zone (35), adjacent to the depositing zone (34), for paying for the goods;

f) wherein said check-out installation is disposed on one side of said goods transport device, and said depositing zone (34) and said paying zone (35) are disposed on an opposite side of said goods transport device;

g) wherein said depositing zone (34) and said paying zone (35) are separated from one another by a barrier (36) which cannot be passed by the customers; and h) wherein said exit installation (22) is disposed at a distance from the goods transport device (32), such that said depositing and paying zones (34, 35), together with said barrier (36), are located between said exit installation (22) and said goods transport device (33).

4. The system as claimed in claim 3, wherein said barrier (36) is an upright wall which screens off the goods transport device (32).

5. The system as claimed in claim 3, wherein the barrier (36) has a passage for a shopping cart.

6. The system as claimed in claim 5, wherein a separate signal device (37, 31) is disposed in front of the depositing zone (34) and/or the exit installation (22).

7. The system as claimed in claim 3, wherein the exit installation (22) and/or the entry installation (10) has an inner region which can be entered, and at least one vertical wall (14, 15; 28, 29) for screening off the inner region toward the outside, and wherein the wall is mechanically coupled to the respective first or second weighing device (11, 23) in the form of a weighing platform (18, 24) filling out a floor area of an interior space.

8. The system as claimed in claim 7, wherein the weighing process on the weighing platform (18, 24) is controllable in response to the position of the respective first and second gate (12, 30), such that the weighing process is conductable in a specific position of said respective gate.

9. The system as claimed in claim 3, comprising two check-out installations, each having a goods transport device, a depositing device and a paying zone, and wherein these check-out installations are arranged relative to one another in an approximately mirror-inverted manner, with a common exit installation being located between the two check-out installations.

10. A system for the prevention of theft by means of and entrance an exit control in salesrooms, comprising:

a) an entry installation (10) comprising a first weighing device (11) for weighing customers entering the salesrooms, a first gate (12) which has to be passed after weighing and a ticket dispenser (13);

b) an exit installation (22) comprising a second weighing device (23) for weighing customers exiting the salesrooms, a second gate (30) which has to be passed after weighing, and a ticket controlling device (25) for comparing the weights measured by said first and second weighing devices (11, 23) and for controlling said second gate (30);

c) a check-out installation (20) comprising a goods transport device (32), and a goods chute (33), adjoining the goods transport device (33), for the delivery of the goods to the customer, or for the receipt of the goods by the customer;

d) a depositing zone (34) for placing goods on the goods transport device; and e) a paying zone (35), adjacent to the depositing zone (34), for paying for the goods;

f) wherein said check-out installation is disposed on one side of said goods transport device, and said depositing zone (34) and said paying zone (35) are disposed on an opposite side of said goods transport device; and g) wherein said exit installation (22) and said entry installation (10) are located on opposite sides on said check-out installation (20).

* * * * *